United States Patent
Du

(10) Patent No.: US 10,303,283 B2
(45) Date of Patent: May 28, 2019

(54) TOUCH DISPLAY PANEL AND CONTROL CIRCUIT THEREOF

(71) Applicant: Shenzhen China Star Optoelectronics Technology Co., Ltd., Shenzhen (CN)

(72) Inventor: Peng Du, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/897,676

(22) PCT Filed: Nov. 2, 2015

(86) PCT No.: PCT/CN2015/093597
§ 371 (c)(1),
(2) Date: Feb. 13, 2018

(87) PCT Pub. No.: WO2017/059613
PCT Pub. Date: Apr. 13, 2017

(65) Prior Publication Data
US 2018/0157366 A1    Jun. 7, 2018

(30) Foreign Application Priority Data
Oct. 10, 2015    (CN) .......................... 2015 1 0655463

(51) Int. Cl.
| | |
|---|---|
| *G06F 3/041* | (2006.01) |
| *G09G 3/00* | (2006.01) |
| *G06F 3/047* | (2006.01) |
| *G06F 11/00* | (2006.01) |
| *G06F 3/044* | (2006.01) |
| *G09G 3/36* | (2006.01) |

(52) U.S. Cl.
CPC ............ *G06F 3/0416* (2013.01); *G06F 3/044* (2013.01); *G06F 3/047* (2013.01); *G06F 3/0412* (2013.01); *G06F 11/00* (2013.01); *G09G 3/00* (2013.01); *G09G 3/006* (2013.01); *G09G 3/3648* (2013.01); *G09G 3/3677* (2013.01); *G09G 3/3688* (2013.01); *G09G 2300/043* (2013.01)

(58) Field of Classification Search
CPC ................................ G06F 3/041; G09G 3/006
See application file for complete search history.

(56) References Cited

U.S. PATENT DOCUMENTS

| | | | | |
|---|---|---|---|---|
| 2008/0062148 | A1* | 3/2008 | Hotelling | G02F 1/13338 345/174 |
| 2013/0044074 | A1* | 2/2013 | Park | G02F 1/13338 345/174 |
| 2015/0022211 | A1* | 1/2015 | Du | G09G 3/006 324/414 |

FOREIGN PATENT DOCUMENTS

CN    103345914    * 10/2013    ............. G09G 3/006

* cited by examiner

*Primary Examiner* — Alexander Eisen
*Assistant Examiner* — Cory A Almeida

(57) ABSTRACT

Provided is a touch control display penal and a touch control circuit thereof. A test signal line and a touch control signal line are redesigned without any change in a conventional pixel structure, such that the touch control circuit as formed has both a test function and a touch detection function. Therefore, not only the manufacturing costs of an in-cell touch display device are effectively reduced, but the manufacturing procedure is simplified, and the yield rate of the touch display panel is improved as well.

18 Claims, 4 Drawing Sheets

TOUCH DISPLAY PANEL AND CONTROL CIRCUIT THEREOF

CROSS-REFERENCE TO RELATED APPLICATIONS

The present application claims the priority of Chinese patent application CN 201510655463.6, entitled "Touch display panel and touch control circuit thereof" and filed on Oct. 10, 2015, the entirety of which is incorporated herein by reference.

FIELD OF THE INVENTION

The present disclosure relates to the technical field of display technologies, and in particular, to a touch control circuit. The present disclosure further relates to a touch display panel with the touch control circuit.

BACKGROUND OF THE INVENTION

As an input medium, a touch screen constitutes a simplest, most convenient, and most natural human-computer interaction mode. Therefore, the touch screen is increasingly applied to a variety of electronic products. In order to reduce the costs of various electronic devices and to render the electronic devices much thinner, the touch screen is usually integrated in a liquid crystal display panel, such as a commonly seen in-cell touch display panel. In the design of the in-cell touch display panel, it is usually necessary to add an additional layer to manufacture a touch sensing circuit. Specifically, in the manufacture of a pixel structure with touch control function of the in-cell touch display panel, because a metal layer has to be added to form a drive signal line and a touch sensing signal line, it is necessary to add a metal layer, an inorganic insulation layer, and two corresponding masks to a pixel structure of a conventional liquid crystal display panel. This arrangement will greatly increase the manufacturing costs of the in-cell touch display panel.

Therefore, there is an urgent need of a technical solution to effectively reduce the manufacturing costs of the in-cell touch display panel.

SUMMARY OF THE INVENTION

The technical problem to be solved by the present disclosure is as follows. In manufacturing an in-cell touch display panel in the prior art, it is necessary to add a metal layer for formation of a touch drive signal line and a touch sensing signal line, and a corresponding inorganic insulation layer and two masks, and this will greatly increase the manufacturing costs of the in-cell touch display panel.

In order to solve the above technical problem, the present disclosure provides an in-cell touch display panel of low manufacturing costs and a touch control circuit thereof.

According to one aspect of the present disclosure, a touch control circuit is provided, comprising:

a first shorting bar, which is provided thereon with first connecting lines for introducing source control signals;

a second shorting bar, which is provided thereon with second connecting lines for introducing source test signals in a test stage, wherein all or part of the second connecting lines are used for receiving touch sensing signals in a touch control stage;

a third shorting bar, which is provided thereon with third connecting lines for introducing gate control signals;

a fourth shorting bar, which is provided thereon with fourth connecting lines for introducing gate test signals in the test stage, wherein all or part of the fourth connecting lines are used for introducing touch drive signals in the touch control stage;

a source transistor switch array, source transistors of which are connected, through their gates, to the first connecting lines, and connect, through their sources and drains, the second connecting lines to data lines of the touch display panel, under an action of the source control signals; and a gate transistor switch array, gate transistors of which are connected, through their gates, to the third connecting lines, and connect, through their sources and drains, the fourth connecting lines to scan lines of the touch display panel, under an action of the gate control signals.

Preferably, in a display stage, the source control signals deactivate all the source transistors in the source transistor switch array, and connect the data lines to data line driving circuits; and the gate control signals deactivate all the gate transistors in the gate transistor switch array, and connect the scan lines to scan line driving circuits.

Preferably, the source transistor switch array is a thin film field effect transistor array or a metal-oxide semiconductor field effect transistor array, and the gate transistor switch array is a thin film field effect transistor array or a metal-oxide semiconductor field effect transistor array.

Preferably, the touch control circuit and the data lines are arranged in a same layer in an insulating manner.

Preferably, the touch control circuit and the scan lines are arranged in a same layer in an insulating manner.

According to another aspect of the present disclosure, a touch display panel is provided, comprising:

scan lines, data lines, and a sub pixel unit array formed by the scan lines and the data lines, wherein a thin film transistor is arranged in each sub pixel unit;

a first shorting bar, which is provided thereon with first connecting lines for introducing source control signals;

a second shorting bar, which is provided thereon with second connecting lines for introducing source test signals in a test stage, wherein all or part of the second connecting lines are used for receiving touch sensing signals in a touch control stage;

a third shorting bar, which is provided thereon with third connecting lines for introducing gate control signals;

a fourth shorting bar, which is provided thereon with fourth connecting lines for introducing gate test signals in the test stage, wherein all or part of the fourth connecting lines are used for introducing touch drive signals in the touch control stage;

a source transistor switch array, source transistors of which are connected, through their gates, to the first connecting lines, and connect, through their sources and drains, the second connecting lines and the data lines, under an action of the source control signals; and a gate transistor switch array, gate transistors of which are connected, through their gates, to the third connecting lines, and connect, through their sources and drains, the fourth connecting lines to the scan lines, under an action of the gate control signals.

Preferably, in a display stage, the source control signals deactivate all the source transistors in the source transistor switch array, and connect the data lines to data line driving circuits; and the gate control signals deactivate all the gate transistors in the gate transistor switch array, and connect the scan lines to scan line driving circuits.

Preferably, the source transistor switch array is a thin film field effect transistor array or a metal-oxide semiconductor field effect transistor array, and the gate transistor switch array is a thin film field effect transistor array or a metal-oxide semiconductor field effect transistor array.

Preferably, the touch control circuit and the data lines are arranged in a same layer in an insulating manner.

Preferably, the touch control circuit and the scan lines are arranged in a same layer in an insulating manner.

Compared with the prior art, one or more embodiments in the above solution can have the following advantages or beneficial effects.

The present disclosure redesigns the test signal line and the touch control signal line without changing a conventional pixel structure, enabling the touch control circuit as formed with both a test function and a touch detection function. The touch control circuit can be arranged on the same layer in an insulating manner either with the scan lines or with the data lines, so that no additional metal layer is necessary to form the touch control circuit. Compared with an existing technical solution in which the metal layer, and the corresponding inorganic insulating layer and two masks are necessary to be added to form the touch control circuit during the manufacture of the in-cell touch control display device, in the technical solution of the present disclosure, while the manufacturing costs of the in-cell touch control display device is effectively reduced, the manufacturing procedure is simplified, and the yield rate of the touch display panel is improved also.

Other features and advantages of the present disclosure will be further explained in the following description, and partly become self-evident therefore, or be understood through implementing the present disclosure. The objectives and other advantages of the present disclosure will be achieved through the structure specifically pointed out in the description, claims, and the accompanying drawings.

BRIEF DESCRIPTION OF THE DRAWINGS

The following drawings are used to provide further understanding of the present disclosure, and to constitute part of the specification. They serve to interpret the present disclosure together with embodiments of the present disclosure, but not to restrict the present disclosure in any manner. In the drawings.

DETAILED DESCRIPTION OF THE EMBODIMENTS

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

The technical problem to be solved by the present disclosure is that, in manufacturing an in-cell touch display panel in the prior art, it is necessary to add a metal layer for formation of a touch drive signal line and a touch sensing signal line, and a corresponding inorganic insulation layer and two masks, and this will greatly increase the manufacturing costs of the in-cell touch display panel. In order to solve the above technical problem, an in-cell touch display panel of low manufacturing costs and a touch control circuit thereof are provided in embodiments of the present disclosure.

Figure 1:
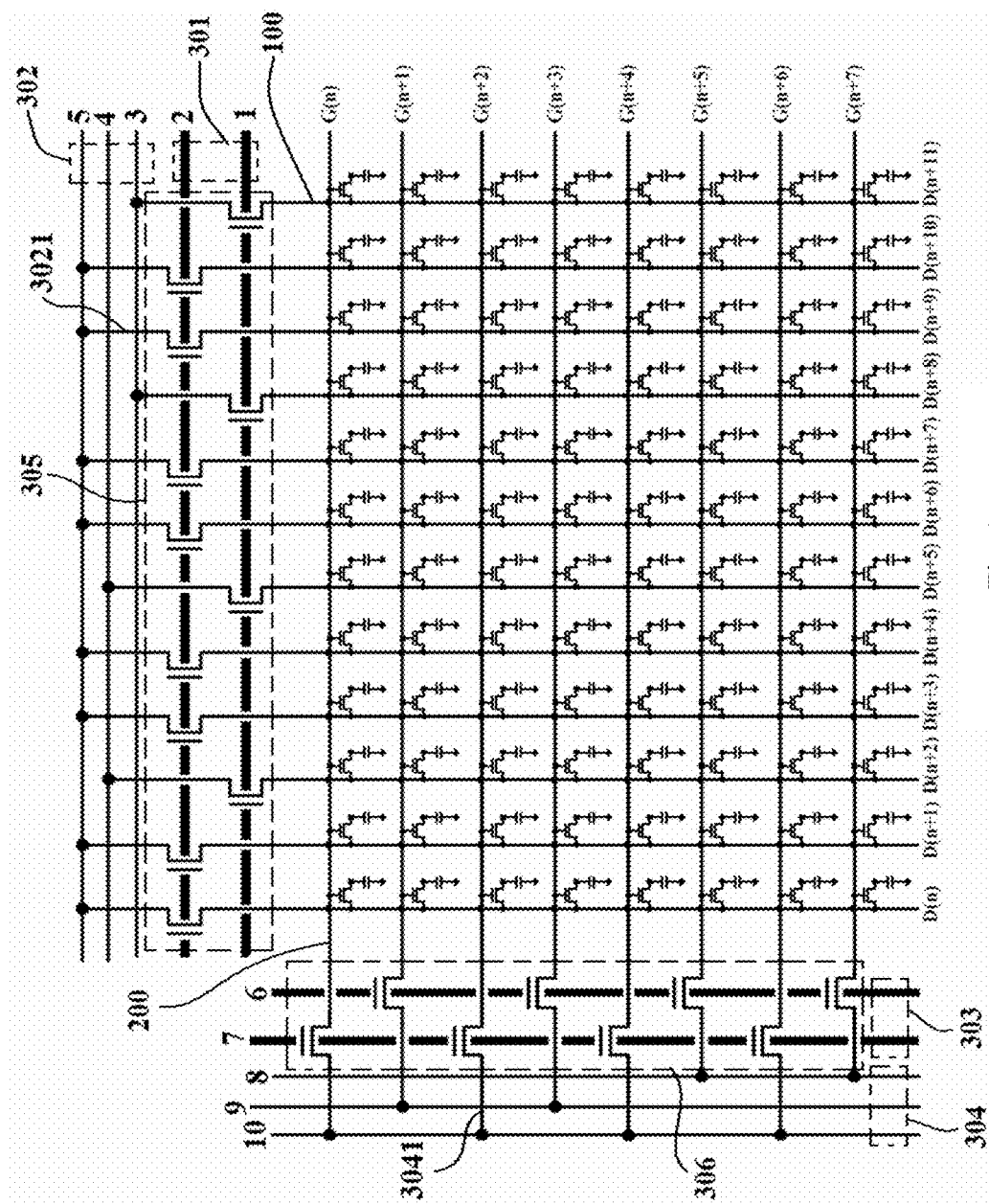
FIG. 1 schematically shows the structure of a touch display panel of an embodiment of the present disclosure.

FIG. 1 schematically shows the structure of a touch display panel in an embodiment of the present disclosure. As shown in FIG. 1, the touch display panel comprises shorting bars, a source transistor switch array 305, a gate transistor switch array 306, a plurality of scan lines 200, a plurality of data lines 100, and a sub pixel unit array formed by the scan lines 200 and the data lines 100. Among them, the data lines 100 are vertically arranged, and successively numbered D(n), D(n+1), . . . , D(n+11) in FIG. 1. The scan lines 200 are horizontally arranged, and successively numbered G(n), G(n+1), . . . , G(n+7) in FIG. 1. A thin film transistor (TFT) is arranged in each sub pixel unit.

Measuring points 1 to 10 are each connected to the data lines 100 and the scan lines 200 of the touch display panel through lines (or connecting lines) provided on the shorting bars and a data switch array. Herein, the data switch array is preferably a thin film field effect transistor (TFT) array or a metal-oxide semiconductor field effect transistor (MOSFET) array.

Specifically, the measuring points 1 to 5 are connected to the data lines 100 of the touch display panel through two first connecting lines (not shown) of a first shorting bar and three second connecting lines 3021 of a second shorting bar 302, and the source transistor switch array 305. Specifically, the source transistor switch array 305 is composed of a plurality of source transistors. The measuring points 1 and 2 are connected to gates of the source transistors of the source transistor switch array 305 through the first connecting lines. The measuring points 3 to 5 are connected to drains of the source transistors through the second connecting lines 3021, and a source of the source transistor is connected to the data line 100 of the touch display panel. The first connecting lines are used for introducing source control signals, so as to control activation and deactivation of the source transistors. The second connecting lines 3021 are used to introduce source test signals in a test stage, wherein all or part of the second connecting lines 3021 are also used to receive touch sensing signals in a touch control stage.

Similarly, the gate transistor switch array 306 is composed of a plurality of gate transistors. The measuring points 6 to 10 are connected to the scan lines 200 of the touch display panel through two third connecting lines (not shown) of a third shorting bar 303 and three fourth connecting lines 3041 of a fourth shorting bar 304, and the gate transistor switch array 306. Specifically, the measuring points 6 and 7 are connected to gates of the gate transistors of the gate transistor switch array 306, through the third connecting lines. The measuring points 8 to 10 are connected to drains of the gate transistors through the fourth connecting lines 3041, and the source of the gate transistor is connected to the scan line of the touch display panel. The third connecting lines are used for introducing gate control signals, so as to control activation and deactivation of the gate transistors. The fourth connecting lines 3041 are used to introduce gate test signals in the test stage, wherein all or part of the fourth connecting lines 3041 are also used to introduce touch drive signals in the touch control stage.

It is worth noting that, according to the actual situation (for example, the number of signal lines necessary for introducing touch drive/sensing signals), different numbers of transistor switches and measuring points can be assigned to the data lines 100 and the scan lines 200 of the touch display panel. For example, with reference to FIG. 1, the measuring points 3 and 4 can both be connected to the data lines 100 through two source transistors, and the measuring point 5 can be connected to the data line 100 through eight source transistors. The measuring points 8 and 9 can be connected to the scan lines 200 through two gate transistors, and the measuring point 10 can be connected to the scan line 200 through four gate transistors.

When the touch display panel works in the test stage, with reference to FIG. 1, a high level voltage can be input to the measuring points 1, 2, 6, and 7, so as to activate all the source transistors and all the gate transistors. And then signals necessary in a test can be respectively loaded to the measuring points 3 to 5 and the measuring points 8 to 10, to perform the test on the touch display panel. When test results show that the touch display panel is normal, a low level voltage can be input to the measuring points 1, 2, 6, and 7, such that the data line 100 can be disconnected with the shorting bar.

After the test is completed, a produced panel needs to go through a final module bonding procedure. After such a procedure, the scan line 200 and the data line 100 in a display area are respectively connected to corresponding driving circuits. That is, the scan line 200 is connected to a scan line driving circuit, and the data line 100 is connected to a data line driving circuit. In the present embodiment, the first connecting lines and the third connecting lines which are used for introducing control signals can be connected either to driving circuits, or to circuits for inputting touch signals. This can be selected according to specific design requirements. In the present embodiment, signal lines provided on the shorting bars can be divided into two types. A first type is only used for the transmission of test signals in the test stage, such as the connecting lines of the measuring point 5 and the connecting lines of the measuring point 10. This type of connecting lines is not connected with any circuit, and is in a floating state after the bonding procedure. A second type is for the transmission of not only the test signals, but also the touch signals, such as the connecting lines of the measuring points 3 and 4, as well as those of the measuring points 8 and 9. This type of connecting lines can be connected to a circuit for inputting either the test signals or the touch signals.

It is worth noting that, in the absence of the bonding procedure performed on the touch display panel, the above touch signals and test signals are provided by a bonding pad arranged on a periphery of the panel.

Figure 2:
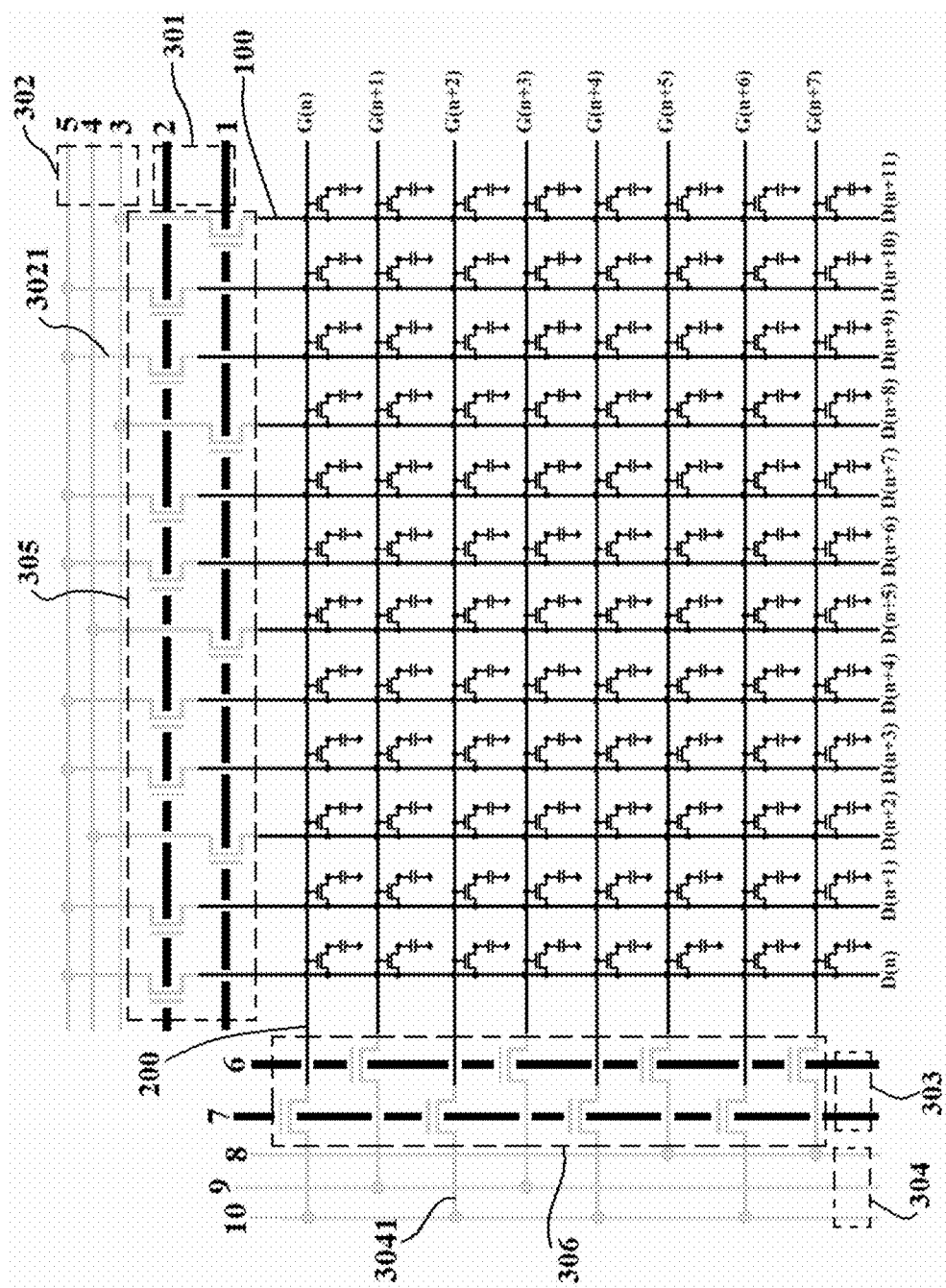
FIG. 2 shows a diagram when the touch display panel of the embodiment of the present disclosure works in a display stage.

FIG. 2 shows a diagram when the touch display panel of the embodiment of the present disclosure works in a display stage. Referring to FIG. 2, when the touch display panel works in the display stage, a low level voltage is input to the measuring points 1, 2, 6, and 7, so as to deactivate all the source transistors and all the gate transistors. At the same time, the data line 100 is connected to the data line driving circuit (not shown in the drawing), and the scan line 200 is connected to the scan line driving circuit (not shown in the drawing). The panel is then controlled for normal display as per a conventional control mode. A gray portion in FIG. 2 indicates a circuit in a floating or grounded state.

When the touch display panel works in the touch control stage, non-touch source transistors of those second connecting lines 3021 which receive no touch sensing signals are all turned off, and touch source transistors of the rest second connecting lines 3021 which receive touch sensing signals are all turned on. Besides, non-touch gate transistors of those fourth connecting lines 3041 introducing no touch drive signals are all turned off, and touch gate transistors of the rest fourth connecting lines 3041 which introduce touch drive signals are all turned on.

In particular, a low level voltage (e.g., −8 V) is input to a gate of the non-touch source transistor through the first connecting line, so as to turn off the non-touch transistor. And a high level voltage (e.g., 33 V) is input to a gate of the touch source transistor through the first connecting line, so as to turn on the touch source transistor. Similarly, a low level voltage is input to a gate of the non-touch gate transistor through the third connecting line, so as to turn off the non-tough gate transistor. And a high level voltage is input to a gate of the touch gate transistor, so as to turn on the touch gate transistor.

Figure 3:
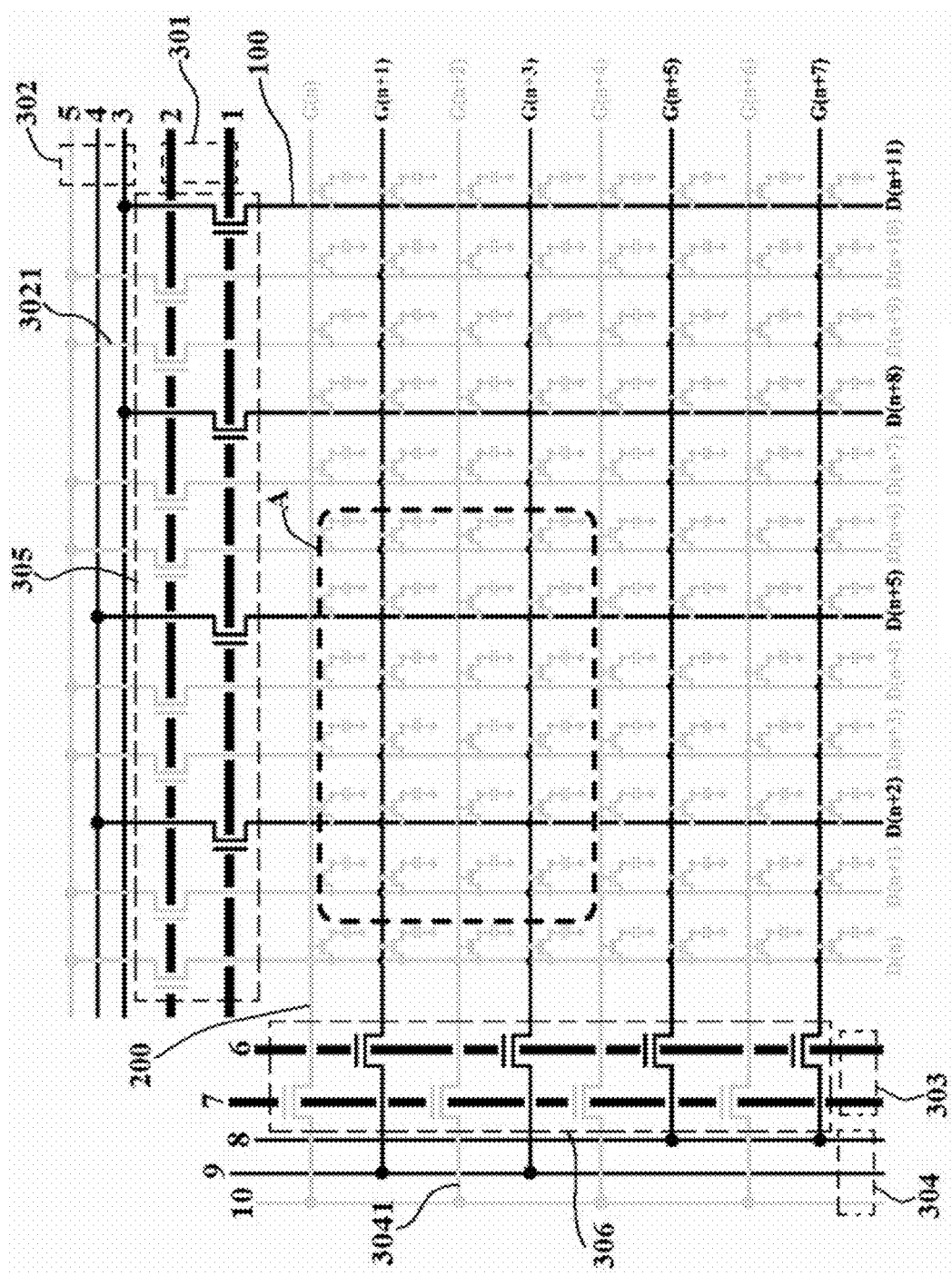
FIG. 3 shows a diagram when the touch display panel of the embodiment of the present disclosure woks in a touch control stage.

Reference can be made to FIG. 3. When the touch display panel works in the touch control stage, a high level voltage is input to the measuring points 1 and 6, and a low level voltage is input to the measuring points 2 and 7. This arrangement allows the data lines 100 numbered D(n+2), D(n+5), D(n+8), and D(n+11) respectively as the touch sensing signal lines (RX signal lines) for receiving the touch sensing signals, and meanwhile, allow the scan lines 200 numbered G(n+1), G(n+3), G(n+5), and G(n+7) respectively as the touch drive signal lines (TX signal lines) for introducing the touch drive signals. In addition, in the touch control stage, all the transistors in the display area are turned off, so that a touch detection action will not affect the display effect of the panel.

Inside the display area of the entire touch display panel, four TX signal lines and perpendicularly arranged with four RX signal lines, and their overlapping areas constitute touch sensing modules for transmittance of capacitive touch, such as area A shown in FIG. 3. This area has a size of about 5-6 mm. FIG. 3 is only a diagram, and the actual number of the TX signal lines and the RX signal lines should be determined by the size of the pixel. The capacitance between the TX signal lines and the RX signal lines is parasitic capacitance formed by an overlapping portion of the data lines 100 and the scan lines 200 in a conventional panel.

Figure 4:
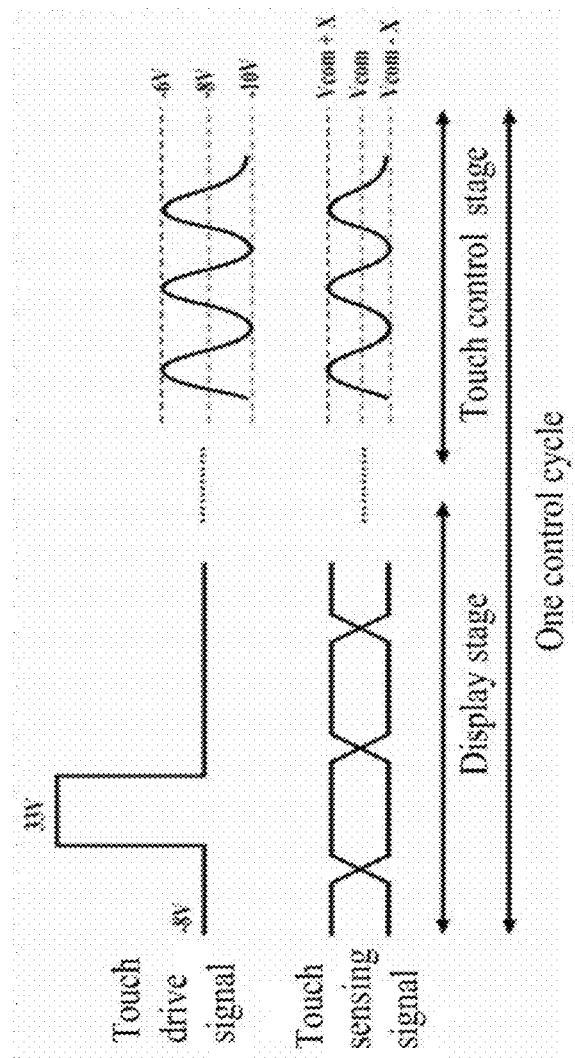
FIG. 4 shows a control timing diagram when the touch display panel of the embodiment of the present disclosure works.

FIG. 4 shows a control timing diagram when the touch display panel of the embodiment of the present disclosure works. As shown in FIG. 4, one control cycle (time period of one image frame) is divided into two parts: the display stage (working time period of LCD) and the touch control stage. In the display stage, waveforms of the scan line 200 and the data line 100 are exactly the same as those in a conventional TFT-LCD. In the touch control stage, a high-frequency sine wave is input to the TX signal line, which has a mean value the same as that of other scan lines 200 (−8 V), and an amplitude of 2 V. Such an arrangement enables the high-frequency sine wave input to the TX signal line to have a maximum peak voltage of −6 V. This voltage can still allow the thin film transistor inside the pixel to keep in an inactive state, and display effect of the panel will thus be unaffected. Reference can still be made to FIG. 4. The RX signal line is placed in a grounded state or a voltage Vcom is put therein. Due to a coupling effect of the capacitance, a sine wave having a smaller amplitude, a mean value of Vcom (V), and a maximum peak voltage of X (V), will be accordingly generated on the RX signal line also. However, because all of the thin film transistors in the pixel are deactivated, the voltage on the RX signal line will not be written into the pixel electrode.

When the touch display panel according to the embodiment of the present disclosure is used, the test signal line and the touch control signal line can be redesigned without any change in the conventional pixel structure, so as to enable the touch control circuit as formed to have both the test function and the touch detection function. The touch control circuit can be arranged on the same layer in an insulating manner either with the scan line 200 or with the data line 100, such that no additional metal layer will be necessary to form the touch control circuit. Compared with an existing technical solution in which the metal layer for formation of the touch control circuit, and the corresponding inorganic insulation layer and two masks are necessary to be added during the manufacture of the in-cell touch control display device, in the technical solution according to the embodiment of the present disclosure, while the manufacturing costs of the in-cell touch control display device is effectively reduced, the manufacturing procedure is simplified, and the yield rate of the touch display panel is improved also.

The above embodiments are described only for better understanding, rather than restricting, the present disclosure. Any person skilled in the art can make amendments to the implementing forms or details without departing from the spirit and scope of the present disclosure. The scope of the present disclosure should still be subject to the scope defined in the claims.

The invention claimed is:

1. A touch control circuit of a touch display panel, comprising:
   a first shorting bar, which is provided thereon with first connecting lines for introducing source control signals;
   a second shorting bar, which is provided thereon with second connecting lines for introducing source test signals in a test stage, wherein all or part of the second connecting lines are used for receiving touch sensing signals in a touch control stage;
   a third shorting bar, which is provided thereon with third connecting lines for introducing gate control signals;
   a fourth shorting bar, which is provided thereon with fourth connecting lines for introducing gate test signals in the test stage, wherein all or part of the fourth connecting lines are used for introducing touch drive signals in the touch control stage;
   a source transistor switch array, source transistors of which are connected, through their gates, to the first connecting lines, and connect, through their sources and drains, the second connecting lines to data lines of the touch display panel, under an action of the source control signal; and
   a gate transistor switch array, gate transistors of which are connected, through their gates, to the third connecting lines, and connect, through their sources and drains, the fourth connecting lines to scan lines of the touch display panel, under an action of the gate control signals,
   wherein, in the touch control stage, all transistors in a display area are turned off;
   wherein a first measuring point and a second measuring point are connected to the gates of the source transistors of the source transistor switch array through the first connecting lines; a third measuring point, a fourth measuring point and a fifth measuring point are connected to the drains of the source transistors through the second connecting lines; the sources of the source transistors are connected to the data lines of the touch display panel;
   a sixth measuring point and a seventh measuring point are connected to the gates of the gate transistors of the gate transistor switch array through the third connecting lines; an eighth measuring point, a ninth measuring point and a tenth measuring point are connected to the drains of the gate transistors through the fourth connecting lines; the sources of the gate transistors are connected to the scan lines of the touch display panel;
   a number of the gates of the source transistors connected to the first measuring point is less than that of the source transistors connected to the second measuring point; a number of the drains of the source transistors connected to the third measuring point is equal to that of the source transistors connected to the fourth measuring point, and is less than that of the source transistors connected to the fifth measuring point;
   a number of the gates of the gate transistors connected to the sixth measuring point is less than that of the gate transistors connected to the seventh measuring point; a number of the drains of the gate transistors connected to the eighth measuring point is equal to that of the gate transistors connected to the ninth measuring point, and is less than that of the gate transistors connected to the tenth measuring point.

2. The touch control circuit of claim 1, wherein the source transistor switch array is a thin film field effect transistor array or a metal-oxide semiconductor field effect transistor array, and the gate transistor switch array is a thin film field effect transistor array or a metal-oxide semiconductor field effect transistor array.

3. The touch control circuit of claim 1, wherein the touch control circuit and the data lines are arranged in a same layer in an insulating manner.

4. The touch control circuit of claim 1, wherein the touch control circuit and the scan lines are arranged in a same layer in an insulating manner.

5. The touch control circuit of claim 1, wherein in a display stage, the source control signals deactivate all the source transistors in the source transistor switch array, and connect the data lines to data line driving circuits; and the gate control signals deactivate all the gate transistors in the gate transistor switch array, and connect the scan lines to scan line driving circuits.

6. The touch control circuit of claim 5, wherein the source transistor switch array is a thin film field effect transistor array or a metal-oxide semiconductor field effect transistor array, and the gate transistor switch array is a thin film field effect transistor array or a metal-oxide semiconductor field effect transistor array.

7. The touch control circuit of claim 5, wherein the touch control circuit and the data lines are arranged in a same layer in an insulating manner.

8. The touch control circuit of claim 5, wherein the touch control circuit and the scan lines are arranged in a same layer in an insulating manner.

9. The touch control circuit of a touch display panel of claim 1, wherein the second connecting lines connected to the fifth measuring point and the fourth connecting lines connected to the tenth measuring point are in a floating state after the test is completed; the second connecting lines connected to the third and fourth measuring point, and the fourth connecting lines connected to the eighth and ninth measuring point are connected to a circuit for inputting either the test signals or the touch signals.

10. A touch display panel having a touch control circuit, the touch control circuit comprising:
scan lines, data lines, and a sub pixel unit array formed by the scan lines and tire data lines, wherein a thin film transistor is arranged in each sub pixel unit;
a first shorting bar, which is provided thereon with first connecting lines for introducing source control signals;
a second shorting bar, which is provided thereon with second connecting lines for introducing source test signals in a test stage, wherein all or part of the second connecting lines are used for receiving touch sensing signals in a touch control stage;
a third shorting bar, which is provided thereon with third connecting lines for introducing gate control signals;
a fourth shorting bar, which is provided thereon with fourth connecting lines for introducing gate test signals in the test stage, wherein all or part of the fourth connecting lines are used for introducing touch drive signals in the touch control stage;
a source transistor switch array, source transistors of which are connected, through their gates, to the first connecting lines, and connect, through their sources and drains, the second connecting lines to the data lines, under an action of the source control signals; and
a gate transistor switch array, gate transistors of which are connected, through their gates, to the third connecting lines, and connect through their sources and drains, the fourth connecting lines to the scan lines, under an action of the gate control signals,
wherein, in the touch control stage, all transistors in a display area are turned off;
wherein a first measuring point and a second measuring point are connected to the gates of the source transistors of the source transistor switch array through the first connecting lines; a third measuring point, a fourth measuring point and a fifth measuring point are connected to the drains of the source transistors through the second connecting lines; the sources of the source transistors are connected to the data lines of the touch display panel;
a sixth measuring point and a seventh measuring point are connected to the gates of the gate transistors of the gate transistor switch array through the third connecting lines; an eighth measuring point, a ninth measuring point and a tenth measuring point are connected to the drains of the gate transistors through the fourth connecting lines; the sources of the gate transistors are connected to the scan lines of the touch display panel;
a number of the gates of the source transistors connected to the first measuring point is less than that of the source transistors connected to the second measuring point; a number of the drains of the source transistors connected to the third measuring point is equal to that of the source transistors connected to the fourth measuring point, and is less than that of the source transistors connected to the fifth measuring point;
a number of the gates of the gate transistors connected to the sixth measuring point is less than that of the gate transistors connected to the seventh measuring point; a number of the drains of the gate transistors connected to the eighth measuring point is equal to that of the gate transistors connected to the ninth measuring point, and is less than that of the gate transistors connected to the tenth measuring point.

11. The touch display panel of claim 10, wherein the source transistor switch array is a thin film field effect transistor array or a metal-oxide semiconductor field effect transistor array, and the gate transistor switch array is a thin film field effect transistor array or a metal-oxide semiconductor field effect transistor array.

12. The touch display panel of claim 10, wherein the touch control circuit and the data lines are arranged in a same layer in an insulating manner.

13. The touch display panel of claim 10, wherein the touch control circuit and the scan lines are arranged in a same layer in an insulating manner.

14. The touch display panel of claim 10, wherein in a display stage, the source control signals deactivate all the source transistors in the source transistor switch array, and connect the data lines to data line driving circuits; and the gate control signals deactivate all the gate transistors in the gate transistor switch array, and connect the scan lines to scan line driving circuits.

15. The touch display panel of claim 14, wherein the source transistor switch array is a thin film field effect transistor array or a metal-oxide semiconductor field effect transistor array, and the gate transistor switch array is a thin film field effect transistor array or a metal-oxide semiconductor field effect transistor array.

16. The touch display panel of claim 14, wherein the touch control circuit and the data lines are arranged in a same layer in an insulating manner.

17. The touch display panel of claim 14, wherein the touch control circuit and the scan lines are arranged in a same layer in an insulating manner.

18. The touch display panel of claim 10, wherein the second connecting lines connected to the fifth measuring point and the fourth connecting lines connected to the tenth measuring point are in a floating state after the test is completed; the second connecting lines connected to the third and fourth measuring point, and the fourth connecting lines connected to the eighth and ninth measuring point are connected to a circuit for inputting either the test signals or the touch signals.

* * * * *